United States Patent
Fraser

(10) Patent No.: US 10,417,930 B1
(45) Date of Patent: Sep. 17, 2019

(54) VEHICLE DRIVING SIMULATOR WITH PRESSURE SENSITIVE HANDLEBAR INPUT SENSOR

(71) Applicant: Techlusion Corporation, Belgrade, MT (US)

(72) Inventor: Jacob L. Fraser, Bozeman, MT (US)

(73) Assignee: Techlusion Corporation, Belgrade, MT (US)

( * ) Notice: Subject to any disclaimer, the term of this patent is extended or adjusted under 35 U.S.C. 154(b) by 222 days.

(21) Appl. No.: 15/378,651

(22) Filed: Dec. 14, 2016

Related U.S. Application Data

(60) Provisional application No. 62/381,597, filed on Aug. 31, 2016, provisional application No. 62/267,046, filed on Dec. 14, 2015.

(51) Int. Cl.
  *G09B 9/058* (2006.01)
  *G09B 9/042* (2006.01)
  *B62K 21/02* (2006.01)

(52) U.S. Cl.
  CPC ............. *G09B 9/058* (2013.01); *G09B 9/042* (2013.01); *B60Y 2200/12* (2013.01); *B62K 21/02* (2013.01)

(58) Field of Classification Search
  CPC ... G09B 9/00; G09B 9/02; G09B 9/04; G09B 9/042; G09B 9/058
  See application file for complete search history.

(56) References Cited

U.S. PATENT DOCUMENTS

| | | | | |
|---|---|---|---|---|
| 3,526,042 A | * | 9/1970 | Nelson | G01M 17/0076 434/61 |
| 3,686,776 A | * | 8/1972 | Dahl | G01M 17/0076 434/61 |
| 4,580,983 A | * | 4/1986 | Cassini | A63B 22/16 280/293 |
| 4,925,183 A | * | 5/1990 | Kim | A63B 22/16 434/61 |
| 5,076,792 A | * | 12/1991 | Niermann | A63B 22/16 434/61 |
| 8,418,541 B2 | | 4/2013 | Kirkpatrick | |
| 8,439,808 B2 | * | 5/2013 | Hamilton | A63B 24/0087 482/61 |
| 9,396,667 B1 | * | 7/2016 | Bober | G09B 9/042 |
| 2005/0175968 A1 | * | 8/2005 | Milner | G09B 9/058 434/61 |
| 2008/0003544 A1 | * | 1/2008 | Handel | G09B 9/058 434/61 |

(Continued)

*Primary Examiner* — Eugene L Kim
*Assistant Examiner* — Alyssa M Hylinski
(74) *Attorney, Agent, or Firm* — MacMillan, Sobanski & Todd, LLC

(57) ABSTRACT

A vehicle driving simulator includes a chassis having two rotatable drums mounted therein, mechanically connected together, and configured to engage wheels of a motorcycle mounted on the chassis. A tilting yoke mechanism is attached to the chassis and includes a substantially rigid frame and a substantially rigid attachment bracket attached to the motorcycle and pivotally attached to the frame. A resistance device is attached between the attachment bracket and the frame, and a tilt sensor is attached to the frame of the tilting yoke mechanism. A pressure sensor may be mounted to a handlebar of the motorcycle and operably connected to a vehicle driving simulator controller.

17 Claims, 5 Drawing Sheets

(56) References Cited

U.S. PATENT DOCUMENTS

2014/0315157 A1* 10/2014 Bober .................... G09B 9/058
434/61
2015/0066325 A1* 3/2015 Tanaka ...................... B60T 7/12
701/70

* cited by examiner

VEHICLE DRIVING SIMULATOR WITH PRESSURE SENSITIVE HANDLEBAR INPUT SENSOR

BACKGROUND OF THE INVENTION

This invention relates in general to machines used to simulate driving conditions, and in particular to a vehicle driving simulator with pressure sensitive handlebar input sensors and a titling yoke mechanism.

Dynamometers have been used for many years in the vehicle manufacturing industry for testing vehicles in place in addition to, or in lieu of, on road testing. Known vehicle dynamometers may be used in a variety of testing operations. In one known application, a dynamometer is used to measure the torque and horsepower output of a vehicle. In another known application, a dynamometer is used to simulate the road load forces and the inertia forces that act on a vehicle during vehicle operation on a roadway. In both applications, users require that the dynamometer be capable of measuring roll torque with a high degree of accuracy.

One known chassis roll dynamometer comprises at least one dynamometer roller that is rotatably mounted in a stationary frame. The roller is configured to support one driven wheel of a vehicle to be tested. In some embodiments the roller may have a large diameter and may be several times larger than the diameter of the supported vehicle wheel. In other embodiments, the roller may have a diameter smaller than the diameter of the supported vehicle wheel. There is a driving engagement between the vehicle wheel and the roller due to the traction forces of the wheel, such that the vehicle wheel may drive the roller. Additionally, in some types of dynamometers the roller may drive the vehicle wheel.

Known dynamometers also include a device for developing a braking torque between the roller and dynamometer frame. Many types of devices for developing the braking torque are known and include frictional and hydraulic devices. Additionally, electromagnetic devices, such as a motor/generator brake and an eddy current brake are known.

Known dynamometers also include an apparatus for simulating road load forces acting on the vehicle wheel, and/or for simulating inertial forces acting on the vehicle during acceleration and deceleration. Known dynamometers may also be configured for use as a driving simulator. Typically, such a driving simulator includes at least one roller for each vehicle wheel or pair of vehicle wheels. Such a driving simulator may also include an apparatus for simulating road load forces acting on the vehicle wheels, and/or for simulating inertia forces acting on the vehicle during acceleration and deceleration. Such road load forces include rolling friction and windage. The apparatus for simulating road load forces may comprise a motor coupled with at least one of the rollers through a roller shaft and a controller for controlling energization of the motor in accordance with the simulation or test being conducted.

In some known dynamometers, a flywheel may be coupled with the roller shaft for simulating inertia. The motor in known dynamometers is often referred to as a power exchange unit because it may be operated to either apply power to the vehicle wheel, or to absorb power from the vehicle wheel through the roller. Additionally, the motor may be operated as a torque generating device, or as a torque absorbing device, and may be either a DC motor or an AC motor.

Known dynamometers that are configured for use as a driving simulator may not however, accurately simulate an on-road driving experience. Thus, it would be desirable to provide an improved vehicle driving simulator that provides an improved and more realistic simulated driving experience.

SUMMARY OF THE INVENTION

This invention relates to an improved structure for a dynamometer configured as a vehicle driving simulator. In a first embodiment, the vehicle driving simulator includes a vehicle driving simulator includes a chassis having two rotatable drums mounted therein, mechanically connected together, and configured to engage wheels of a motorcycle mounted on the chassis. A tilting yoke mechanism is attached to the chassis and includes a substantially rigid frame and a substantially rigid attachment bracket attached to the motorcycle and pivotally attached to the frame. A resistance device is attached between the attachment bracket and the frame, and a tilt sensor is attached to the frame of the tilting yoke mechanism. A pressure sensor may be mounted to a handlebar of the motorcycle and operably connected to a vehicle driving simulator controller.

In a second embodiment, a vehicle driving simulator includes a chassis having two rotatable drums mounted therein, mechanically connected together, and configured to engage wheels of a motorcycle mounted on the chassis. A frame is attached to the chassis and an attachment bracket is attached to the motorcycle and pivotally connected at a pivot joint to the frame. A pressure sensor is mounted to a handlebar of the motorcycle and is operably connected to a vehicle driving simulator controller.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
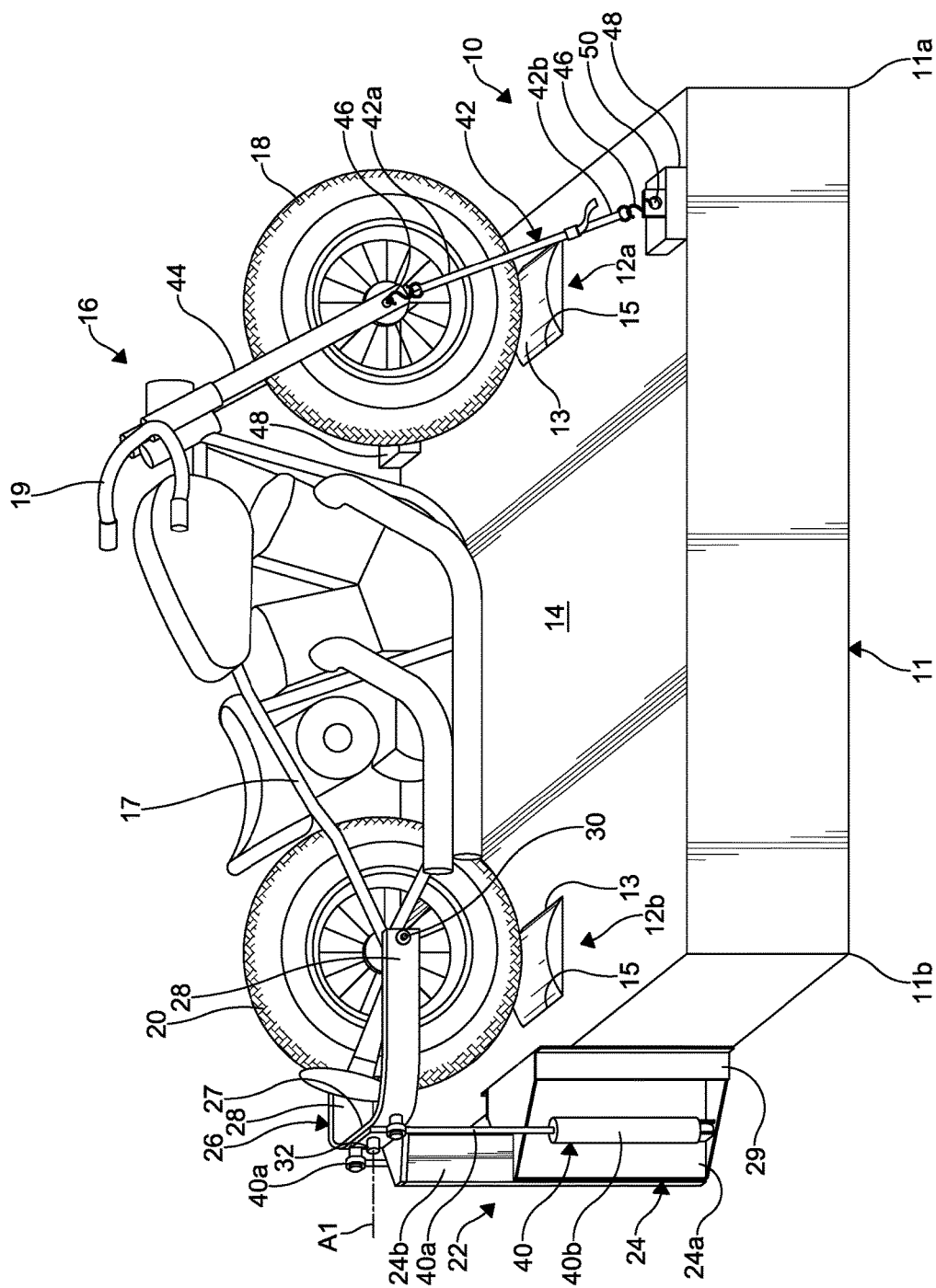
FIG. 1 is a perspective view of a first embodiment of a vehicle driving simulator in accordance with this invention.
Figure 2:
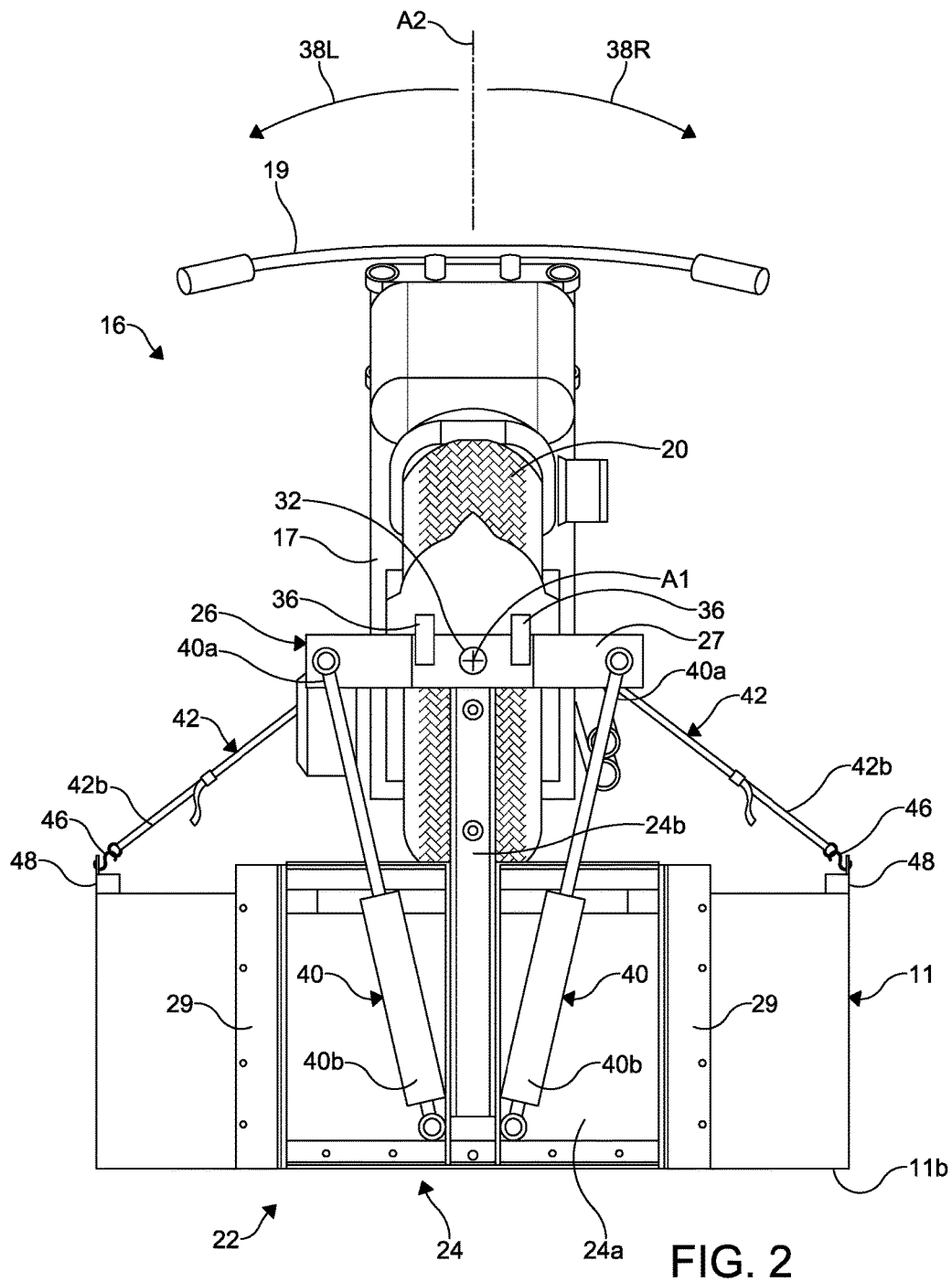
FIG. 2 is an end elevational view of the vehicle driving simulator illustrated in FIG. 1.

Referring now to the drawings, there is illustrated in FIGS. 1 and 2 a basic structure of a vehicle driving simulator 10 constructed in accordance with a first embodiment of the invention. The vehicle driving simulator 10 may be a modification of a conventional chassis dynamometer, such as the dynamometer disclosed in U.S. Pat. No. 8,418,541, the disclosure of which is incorporated herein by reference.

The vehicle driving simulator 10 includes a frame or chassis 11 having a first end 11a (the right end when viewing FIG. 1), a second end 11b (the left end when viewing FIG.

1), and a load supporting surface 14. The load supporting surface 14 includes at least one drum opening 15 formed therein.

The illustrated vehicle driving simulator 10 includes two roller units 12a and 12b, each having a drum 13. The roller units 12a and 12b may be mounted in chambers (not shown) within the chassis 11 below the load supporting surface 14. A portion of each drum 13 extends outwardly through the drum opening 15, such that a vehicle 16 may be driven thereon. Alternatively, the roller units 12a and 12b may be positioned such that no portions thereof extend outwardly (upwardly when viewing FIG. 1) of the load supporting surface 14. The roller units 12a and 12b may be electrically and mechanically linked or connected such that both roller units 12a and 12b operate synchronously. For example, one of the roller units 12a and 12b may be connected to a motor (not shown), and also connected to the other of the roller units 12a and 12b by any desired means, such as a belt (not shown), a chain (not shown), or with gears (not shown). The chassis 11 and the drums 13 may be formed from any substantially rigid material such as steel. Alternatively, the chassis 11 and the drums 13 may be formed from other metals, metal alloys, and non-metal material, such as polymers and composite materials.

The illustrated vehicle 16 is a conventional motorcycle and has two ground engageable wheels comprising one steerable front wheel 18 and one rear wheel 20, and handlebars 19. In the illustrated embodiment, the rear wheel 20 is the driven wheel.

Alternatively, the vehicle driving simulator 10 may be configured to support a vehicle (not shown) having four ground engageable wheels. For a typical four-wheel vehicle, regardless of whether it is equipped with a two or four-wheel drive transmission, it is preferred that one roller unit 12a or 12b be provided for each wheel. The number of roller units 12a and 12b may be selected to match the vehicle mounted on the vehicle driving simulator. Thus, for the vehicle driving simulator 10 configured for the motorcycle 16, two roller units 12a and 12b are required.

It will be appreciated that the chassis 11 may also be configured with any desired number of roller load test units 12a and 12b. The number of roller units 12a and 12b may, for example, be selected to correspond to the configuration of the vehicle being tested and to the number of driven wheels in the vehicle being tested. Thus, to test a vehicle having only one driven wheel, such as the illustrated motorcycle 16, only one roller unit 12a or 12b is required, although two roller units 12a and 12b may be provided as shown.

The vehicle driving simulator 10 may be provided with a tilting yoke mechanism 22 that may be securely attached to the chassis 11 and an axle of the rear wheel 20. The tilting yoke mechanism 22 includes a substantially rigid frame 24, a substantially rigid attachment bracket 26, and may include a load sensing mechanism, such as a load cell 32. The frame 24 includes a base 24a and an outwardly extending (upwardly extending when viewing FIG. 1) mounting post 24b. The base 24a and the mounting post 24b may be formed from any substantially rigid material such as steel. Alternatively, the base 24a and the mounting post 24b may be formed from other metals, metal alloys, and non-metal material, such as polymers and composite materials.

The attachment bracket 26 may be pivotally mounted to the attachment mounting post 24b about a longitudinal pivot axis A1 and is configured to be attached to the chassis or frame 17 of the motorcycle 16 so as to support the motorcycle 16 on the vehicle driving simulator 10. The attachment bracket 26 may be pivotally attached to the mounting post 24b by any desired method such as by a spindle (not shown) that extends through a tapered roller bearing (not shown). In this embodiment, the attachment bracket 26 may rotate about the spindle (not shown). Alternatively, the attachment bracket 26 may be attached to the mounting post 24b by a bolt (not shown) that extends through a bushing (not shown), thereby allowing the attachment bracket 26 to rotate about the bolt (not shown). Alternatively, the attachment bracket 26 may include a pin (not shown) that is slidably mounted in an arcuate slot (not shown) formed in the mounting post 24b, such that the pin (not shown) may move within the slot (not shown) when the motorcycle 16 leans when simulating the execution of a turn to the left or right as described in detail below.

It will be understood that the attachment bracket 26 may be pivotally mounted to the mounting post 24b at any location on the mounting post 24b between an axle of the wheel 20 and the load supporting surface 14 of the chassis 11, including as illustrated in FIGS. 1 and 2.

The illustrated attachment bracket 26 is substantially U-shaped and includes a base portion 27 and two substantially parallel legs 28 extending from the base portion 27. Each leg 28 has a vehicle mounting aperture 30 formed therein at a distal end thereof. Alternatively, the attachment bracket 26 may have any other desired shape. The vehicle mounting apertures 30 are configured to be attached to an axle (not shown) of the rear wheel 20 of the motorcycle 16. Alternatively, the attachment bracket 26 may be attached to any other desired portion of the motorcycle frame.

The attachment bracket 26 may be formed from any substantially rigid material such as steel. Alternatively, the attachment bracket 26 may be formed from other metals, metal alloys, and non-metal material, such as polymers and composite materials.

The load cell 32 may be positioned between, and attached to both the mounting post 24b of the frame 24 and the attachment bracket 26. The load cell 32 may be any type of load cell, such as a washer type load cell, and is positioned such that the longitudinal axis A1 of the motorcycle 16 runs therethrough. The load cell 32 may also be any other type of load cell, load sensor, or other device that measures force in the longitudinal direction, i.e., along the axis A1, of the motorcycle 16.

The load cell 32 may be mounted, for example, between a retaining nut (not shown) of the spindle (not shown) and the structures to which the spindle (not shown) is mounted, such as the mounting post 24b and the attachment bracket 26. Alternatively, in an embodiment wherein the attachment bracket 26 is attached to the mounting post 24b by a bolt (not shown), the load cell 32 may be mounted between a head of the bolt (not shown) and the structure to which the bolt (not shown) is mounted, such as the mounting post 24b and the attachment bracket 26.

Additionally, one or more strain gauges (not shown) may be mounted to the base portion 27 of the attachment bracket 26. In such an embodiment, the strain gauge or gauges (not shown) may be configured to measure strain on the base portion 27. It will be understood that a load exerted by the motorcycle 16 may be calculated from measurement data measured by the strain gauge (not shown).

The base 24a of the frame 24 may be attached to the chassis 11 of the vehicle driving simulator 10 by any desired method such as by welding or with mechanical fasteners. In the embodiment illustrated in FIGS. 1 and 2, the base 24a is attached to the chassis 11 with elongated brackets 29. Alternatively, the base 24a may be attached to a floor (not shown) or a wall (not shown) of a building (not shown) in which the vehicle driving simulator 10 and the tilting yoke mechanism 22 are housed. If the base 24a is attached to a structure other than the chassis 11 of the vehicle driving simulator 10, the chassis 11 is also preferably attached to the same structure such that the tilting yoke mechanism 22 is fixed relative to the vehicle driving simulator 10.

The tilting yoke mechanism 22 thus secures the motorcycle 16 in an upright position relative to the vehicle driving simulator 10, ensures that the vehicle wheels 18 and 20 are positioned on the roller units 12a and 12b, and effectively isolates the sensed and measured force longitudinally (in a fore and aft direction) along a length of the motorcycle 16 (see the axis A1).

In an embodiment of a vehicle driving simulator, such as the vehicle driving simulator 10, that includes a load cell 32 mounted between the frame 24 and the attachment bracket 26, the load cell 32 may measure longitudinal force between the frame 24 and the attachment bracket 26, and not within the chassis 11 of the vehicle driving simulator 10. Advantageously, force measurement errors that may occur within the vehicle driving simulator 10 due to drag, such as caused by bearing resistance, rolling resistance, and/or air resistance may be mitigated.

A tilt sensing mechanism, such as a tilt sensor 34 (best shown in FIG. 3) is positioned between, and attached to both the mounting post 24b of the frame 24 and the attachment bracket 26. The tilt sensor 34 may be any device that measures tilt relative to a vertical axis A2 (see FIG. 2).

The vehicle driving simulator 10 also includes at least one pneumatic cylinder 40 attached between the attachment bracket 26 and the base 24a. The vehicle driving simulator 10 may also include a pair of straps 42 attached between a front fork 44 of the motorcycle 16 and the chassis 11.

In the embodiment illustrated in FIGS. 1 and 2, two pneumatic cylinders 40 are shown. Alternatively, the vehicle driving simulator 10 may include one pneumatic cylinder 40, or more than two pneumatic cylinders 40. Although pneumatic cylinders 40 are preferred, the vehicle driving simulator 10 may include one or more resistance devices, such as hydraulic cylinders, other pneumatic resistance devices, other hydraulic resistance devices, other similar devices, and elastic cords or bands and the like. The pneumatic cylinders 40 may be operated by a controller (not shown) within the vehicle driving simulator 10 and any desired means, device, or system, such as pneumatic, hydraulic, or mechanical tilt servos, pneumatic, hydraulic, or mechanical actuators, and other types of actuators and/or motors.

If desired, vehicle roll detection sensors 36 (see FIG. 2) may be attached to the tilting yoke mechanism 22. For example, roll detection sensors 36 may be mounted at one or more locations on the attachment bracket 26.

The tilting yoke mechanism 22 limits fore and aft longitudinal travel (i.e., in the direction or the horizontal axis A1) of the motorcycle 16 while allowing the motorcycle 16 to tilt or pivot about the horizontal axis A1. By adjusting the relative positions (i.e., the length) of the pneumatic cylinders 40, the motorcycle 16 may be caused to lean. During the course of a vehicle driving simulation of the motorcycle 16, for example, the motorcycle 16 may lean relative to the vertical axis A2 when simulating the execution of a turn to the left (see the arrow 38L) or to the right (see the arrow 38R). Such leaning may also cause the motorcycle 16 to pivot about the longitudinal axis A1. If provided, the roll detection sensors 36 will detect the leaning movement of the motorcycle 16. Leaning or roll measurements taken by the roll detection sensors 36 may then be used to provide simulated turning data to driving simulation software in the controller (not shown), such as a computer or microprocessor (not shown).

A first end 40a of each pneumatic cylinder 40 may be mounted to an outboard side of the base portion 27 of the attachment bracket 26, and a second end 40b pneumatic cylinders 40 may be mounted to a lower central portion of the frame 24 such that the second end 40b of each pneumatic cylinder 40 is mounted at an acute angle relative to an axis of the attachment arm 24b; i.e., the axis A2.

A first end 42a of each strap 42 may be mounted to the front fork 44 at an axle of the front wheel 18 by any means, such as an S-hook 46. A second end 42b of each strap 42 may be mounted to the chassis 11 at an outboard side thereof by any means, such as the S-hook 46. The chassis 11 may include a strap mounting bracket 48 having an S-hook receiving aperture 50 formed therein. The straps 42 may be adjustable in length and may be formed from any desired material, such as nylon, rubber, and polyester. Alternatively, devices or connecting members other than the straps 42 and the S-hooks 46 may be used to connect the front fork 44 and the chassis 11, such as one or more springs (not shown), chains (not shown), solid rods (not shown), and articulated strut assemblies (not shown).

In operation, i.e., during a vehicle driving simulation, the motorcycle 16 may lean during simulated turns. As described above, the motorcycle 16 may lean relative to the vertical axis A2 to the left (see the arrow 38L) or to the right (see the arrow 38R). Such leaning will cause the motorcycle to pivot about the horizontal axis A1. Advantageously, the pneumatic cylinders 40 are operative to prevent the motorcycle 16 from tipping too far to the left or to the right. The illustrated pneumatic cylinders 40 are also configured to provide increased resistance as the motorcycle 16 leans a greater distance to the left, in the direction of the arrow 38L, or to the right, in the direction of the arrow 38R, thus helping keep the motorcycle 16 upright.

Additionally, the straps 42 are configured and mounted to prevent the front wheel 18 from moving off the drum 13. Further, the pneumatic cylinders 40 and the straps 42 work together to allow the motorcycle 16 to execute a leaning movement that is very similar to the leaning movement the motorcycle 16 may experience during normal operation on a road. The axle of the front wheel 18 is thus constrained from lateral movement, but the front wheel 18 may be turned during a typical steering movement, and the motorcycle 16, including the front wheel 18, may be tilted. The pneumatic cylinders 40 may also be adjustable in response to the weight of the motorcycle 16 being tested, and in response to the weight of the motorcycle driver on the motorcycle 16 being tested.

The vehicle driving simulator 10 may also include a head-up display (not shown) to provide an enhanced visual experience for the driver. The head-up display may be configured as a screen suitably mounted so that it is positioned in front of the driver's head, or may be incorporated into the visor of a helmet worn by the motorcycle driver.

Conventional head-up displays show information where the driver needs it—directly in the driver's line of sight. Such information may include speed, warning signals, and indicator arrows for navigation. The driver may therefore see this information in the head-up display without looking down to the instrument cluster or a secondary display. Additionally, the head-up display in the vehicle driving simulator 10 may include a video image of a simulated driving environment.

Although not illustrated, the vehicle driving simulator 10 may be configured for vehicle driving simulation of a four wheel vehicle; i.e., a vehicle having four ground engagable wheels. In such an embodiment (not shown) each of the drive wheels may be disposed on one elongated rotatable drum (not shown). Alternatively, each of the drive wheels may be disposed on separate rotatable drums (not shown), such as the drums 13. The front, steerable wheels of the vehicle may disposed on rotatable plates (not shown) that rotate when the steerable wheels are turned. Alternatively, the front, steerable wheels of the vehicle may be disposed on drums (not shown, but similar to the drum 13) that rotate when the steerable wheels are turned. The vehicle driving simulator 10, if configured for use with a four wheel vehicle, may be configured to cause the rotatable plates or rotatable drums to rotate to thereby cause the steerable wheels to turn to the left or the to the right.

Figure 3:
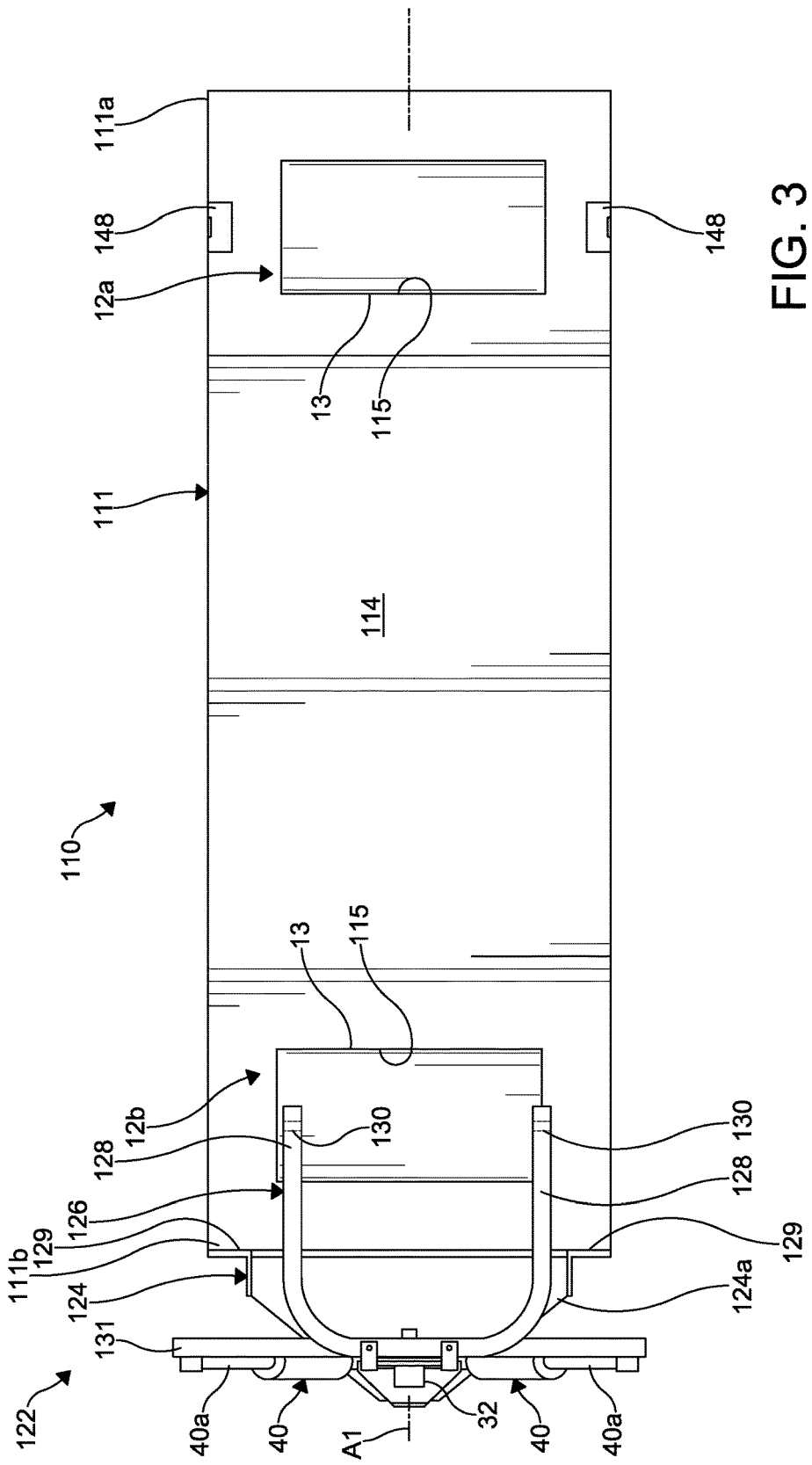
FIG. 3 is a top plan view of a second embodiment of the vehicle driving simulator in accordance with this invention.
Figure 4:
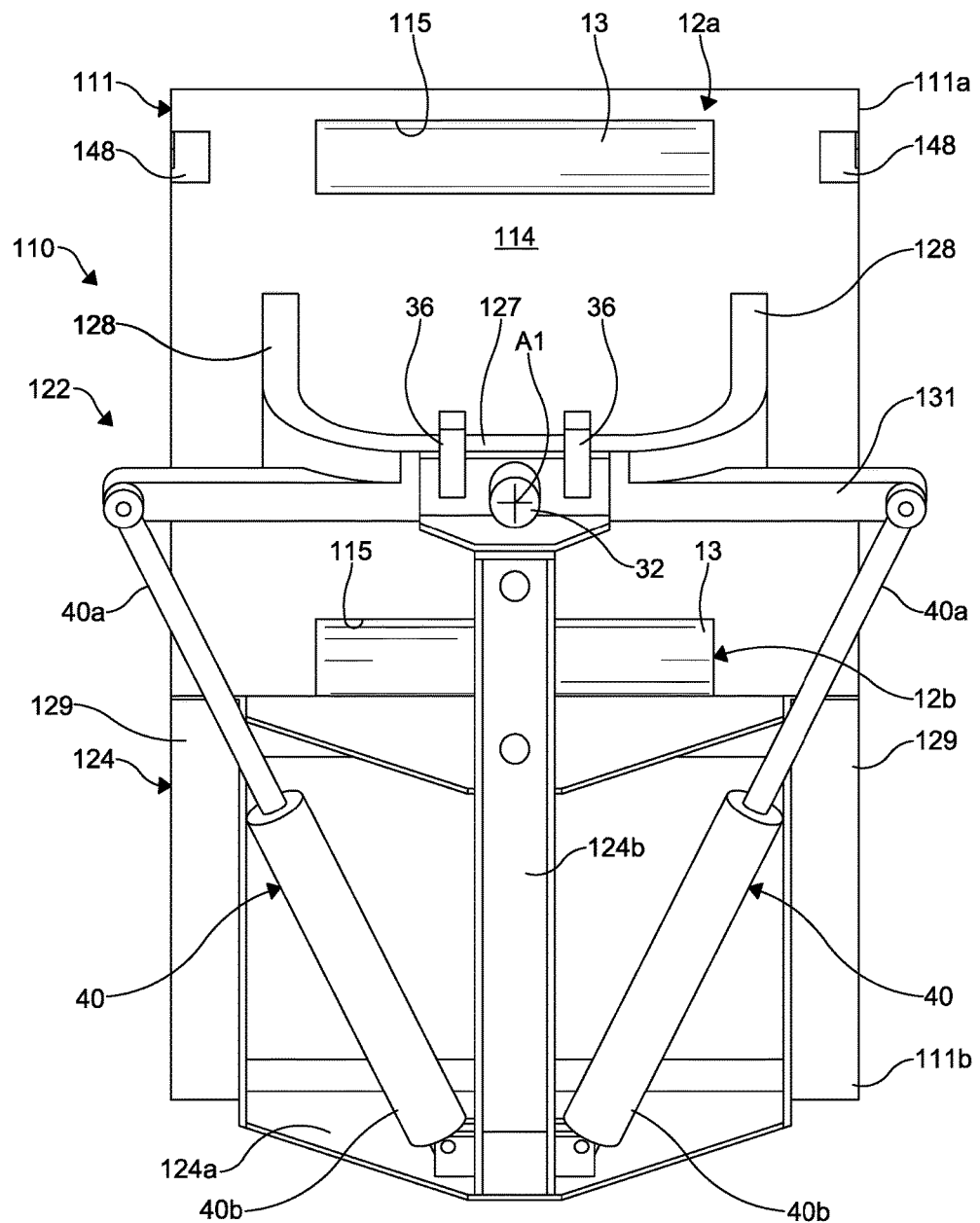
FIG. 4 is a perspective view of the vehicle driving simulator illustrated in FIG. 3 showing the tilting yoke mechanism.
Figure 5:
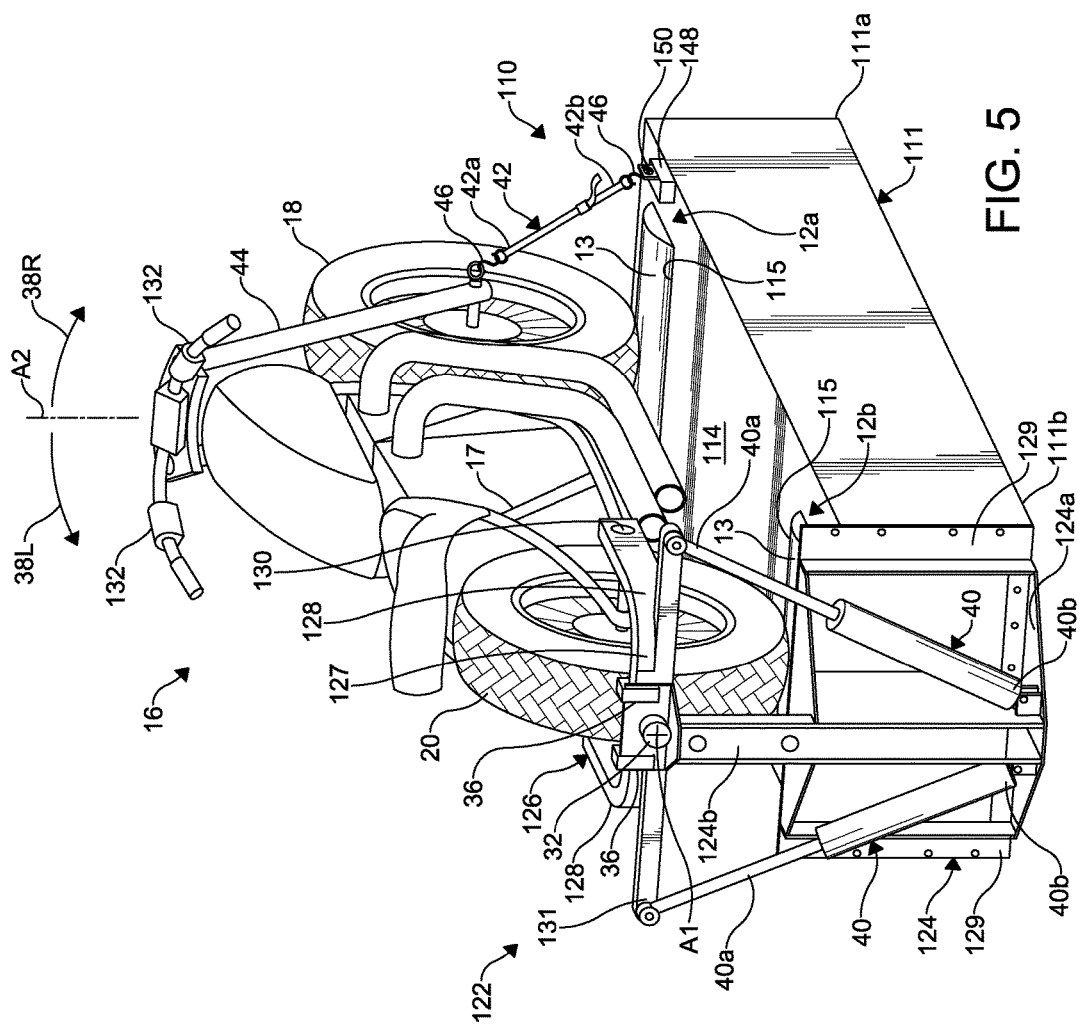
FIG. 5 is a perspective view of the vehicle driving simulator illustrated in FIGS. 3 and 4 shown with a motorcycle mounted thereon and handlebar pressure sensors mounted to the motorcycle.

Referring now to FIGS. 3 through 5, a second embodiment of the vehicle driving simulator 10 is shown at 110. The vehicle driving simulator 110 is substantially similar to the vehicle driving simulator 10 but additionally includes at least one handlebar pressure sensor 132, described below.

The vehicle driving simulator 110 includes a frame or chassis 111 having a first end 11a (the right end when viewing FIG. 3), a second end 111b (the left end when viewing FIG. 3), and a load supporting surface 114. The load supporting surface 114 includes at least one drum opening 115 formed therein.

The illustrated vehicle driving simulator 110 includes two of the roller units 12a and 12b, each having the drum 13. The roller units 12a and 12b may be mounted in chambers (not shown) within the chassis 111 below the load supporting surface 114, and may operated as described above. The chassis 111 and the drums 13 may be formed from any substantially rigid material such as steel. Alternatively, the chassis 111 and the drums 13 may be formed from other metals, metal alloys, and non-metal material, such as polymers and composite materials.

The illustrated motorcycle 16 has two ground engageable wheels comprising one steerable front wheel 18 and one rear wheel 20. In the illustrated embodiment, the rear wheel 20 is the driven wheel. Like the vehicle driving simulator 10, the vehicle driving simulator 110 may be configured to support a vehicle (not shown) having four ground engageable wheels, as described above.

The vehicle driving simulator 110 may be provided with a tilting yoke mechanism 122 that may be securely attached to the chassis 111 and an axle of the rear wheel 20. The tilting yoke mechanism 122 includes a substantially rigid frame 124, a substantially rigid attachment bracket 126, and may include the load cell 32, as described above. The frame 124 includes a base 124a and an outwardly extending (upwardly extending when viewing FIGS. 3 and 5) mounting post 124b. The base 124a and the mounting post 124b may be formed from any substantially rigid material such as steel. Alternatively, the base 124a and the mounting post 124b may be formed from other metals, metal alloys, and non-metal material, such as polymers and composite materials.

The attachment bracket 126 may be pivotally mounted to the attachment mounting post 124b about the longitudinal pivot axis A1 and is configured to be attached to the frame 17 of the motorcycle 16 so as to support the motorcycle 16 on the vehicle driving simulator 110. The attachment bracket 126 may be pivotally attached to the mounting post 124b by any desired method such as by a spindle (not shown) that extends through a tapered roller bearing (not shown). In this embodiment, the attachment bracket 126 may rotate about the spindle (not shown). Alternatively, the attachment bracket 126 may be attached to the mounting post 124b by a bolt (not shown) that extends through a bushing (not shown), thereby allowing the attachment bracket 126 to rotate about the bolt (not shown). Alternatively, the attachment bracket 126 may include a pin (not shown) that is slidably mounted in an arcuate slot (not shown) formed in the mounting post 124b, such that the pin (not shown) may move within the slot (not shown) when the motorcycle 16 leans when simulating the execution of a turn to the left or right as described in detail below.

It will be understood that the attachment bracket 126 may be pivotally mounted to the mounting post 124b at any location on the mounting post 124b between an axle of the wheel 20 and the load supporting surface 114 of the chassis 111, including as illustrated in FIGS. 3 through 5.

The illustrated attachment bracket 126 is substantially U-shaped and includes a base portion 127 and two substantially parallel legs 128 extending from the base portion 127. Each leg 128 has a vehicle mounting aperture 130 formed therein at a distal end thereof. An elongated cylinder mounting member 131 is mounted below the base portion 127 (i.e., to the chassis 111 facing surface of the attachment bracket 126). Alternatively, the attachment bracket 126 may have any other desired shape. The vehicle mounting apertures 130 are configured to be attached to an axle (not shown) of the rear wheel 20 of the motorcycle 16. Alternatively, the attachment bracket 126 may be attached to any other desired portion of the motorcycle frame.

The attachment bracket 126 and the cylinder mounting member 131 may be formed from any substantially rigid material such as steel. Alternatively, the attachment bracket 126 may be formed from other metals, metal alloys, and non-metal material, such as polymers and composite materials.

The load cell 32, described above, may be positioned between, and attached to both the mounting post 124b of the frame 124 and the attachment bracket 126. Additionally, one or more strain gauges (not shown) may be mounted to the base portion 127 of the attachment bracket 126. In such an embodiment, the strain gauge or gauges (not shown) may be configured to measure strain on the base portion 127. It will be understood that a load exerted by the motorcycle 16 may be calculated from measurement data measured by the strain gauge (not shown).

The base 124a of the frame 124 may be attached to the chassis 111 of the vehicle driving simulator 110 by any desired method such as by welding or with mechanical fasteners. In the embodiment illustrated in FIGS. 3 through 5, the base 124a is attached to the chassis 111 with elongated brackets 129. Alternatively, the base 124a may be attached to a floor (not shown) or a wall (not shown) of a building (not shown) in which the vehicle driving simulator 110 and the tilting yoke mechanism 122 are housed. If the base 124a is attached to a structure other than the chassis 111 of the vehicle driving simulator 110, the chassis 111 is also preferably attached to the same structure such that the tilting yoke mechanism 122 is fixed relative to the vehicle driving simulator 110.

The tilting yoke mechanism 122 thus secures the motorcycle 16 in an upright position relative to the vehicle driving simulator 110, ensures that the vehicle wheels 18 and 20 are positioned on the roller units 12a and 12b, and effectively isolates the sensed and measured force longitudinally (in a fore and aft direction) along a length of the motorcycle 16 (see the axis A1).

The tilt sensor 34, described above and best shown in FIG. 3, is positioned between, and attached to both the mounting post 124b of the frame 124 and the attachment bracket 126. The tilt sensor 34 may be any device that measures tilt relative to a vertical axis A2 (see FIGS. 4 and 5).

The vehicle driving simulator 110 also includes at least one of the pneumatic cylinders 40 attached between the cylinder mounting member 131 and the base 124a. The vehicle driving simulator 110 may also include the pair of straps 42 attached between a front fork 44 of the motorcycle 16 and the chassis 111. As described above, a first end 42a of each strap 42 may be mounted to the front fork 44 at an axle of the front wheel 18 by any means, such as with the S-hook 46. A second end 42b of each strap 42 may also be mounted to the chassis 11 at an outboard side thereof by any means, such as with the S-hook 46. The chassis 111 may include a strap mounting bracket 148 having an S-hook receiving aperture 150 formed therein.

In the embodiment illustrated in FIGS. 3 through 5, two pneumatic cylinders 40 are shown. Alternatively, the vehicle driving simulator 110 may include one pneumatic cylinder 40, or more than two pneumatic cylinders 40. Although pneumatic cylinders 40 are preferred, the vehicle driving simulator 110 may include one or more hydraulic cylinders, or similar devices. The pneumatic cylinders 40 may be operated by a controller (not shown) within the vehicle driving simulator 110 and any desired means, device, or system, such as pneumatic, hydraulic, or mechanical tilt servos, pneumatic, hydraulic, or mechanical actuators, and other types of actuators and/or motors.

If desired, the vehicle roll detection sensors 36 (see FIGS. 4 and 5) may be attached to the tilting yoke mechanism 122. For example, roll detection sensors 36 may be mounted at one or more locations on the attachment bracket 126.

The tilting yoke mechanism 122 limits fore and aft longitudinal travel (i.e., in the direction or the horizontal axis A1) of the motorcycle 16 while allowing the motorcycle 16 to tilt or pivot about the horizontal axis A1. By adjusting the relative positions (i.e., the length) of the pneumatic cylinders 40, the motorcycle 16 may be caused to lean. During the course of a vehicle driving simulation of the motorcycle 16, for example, the motorcycle 16 may lean relative to the vertical axis A2 when simulating the execution of a turn to the left (see the arrow 38L) or to the right (see the arrow 38R). Such leaning may also cause the motorcycle 16 to pivot about the longitudinal axis A1. If provided, the roll detection sensors 36 will detect the leaning movement of the motorcycle 16. Leaning or roll measurements taken by the roll detection sensors 36 may then be used to provide simulated turning data to driving simulation software in the controller (not shown), such as a computer or microprocessor (not shown).

A first end 40a of each pneumatic cylinder 40 may be mounted to a distal end of the cylinder mounting member 131, and a second end 40b pneumatic cylinders 40 may be mounted to a lower central portion of the frame 124 such that the second end 40b of each pneumatic cylinder 40 is mounted at an acute angle relative to an axis of the attachment arm 124b; i.e., the axis A2.

The straps 42 may be mounted to the front fork 44 at an axle of the front wheel 18 by any means, as described above.

In the embodiment illustrated in FIG. 5, two handlebar pressure sensors 132 are shown, one on each motorcycle handlebar 19. Alternatively, the vehicle driving simulator 110 may include a handlebar pressure sensor 132 mounted to only one of the two handlebars 114. The handlebar pressure sensors 132 may be electrically connected to the vehicle driving simulator controller (not shown) by a suitable electrical cable. Alternatively, the handlebar pressure sensors 132 may be battery powered and/or may be configured to communicate with the controller and/or each other wirelessly. Although not illustrated, a handlebar pressure sensor 132 may be mounted to one or both of the handlebars 19 of the motorcycle 16 mounted on the vehicle driving simulator 10 illustrated in FIGS. 1 and 2.

In one embodiment of the handlebar pressure sensor 132, each handlebar pressure sensor 132 comprises a plurality of strain gages, e.g., one strain gage on a front side (the forwardly facing side) of the handlebar 19 and one strain gage on a back side (the driver facing side) of the handlebar 19. The two strain gages may be operatively connected by any suitable means, such as by a Wheatstone bridge. Alternatively, the handlebar pressure sensor 132 may comprise a load cell.

The handlebar pressure sensor 132 may comprise any device or plurality of devices capable of detecting and measuring very small amounts of movement, such as within the range of +/−about 0.00001 inch or greater, of each handlebar 19 caused by the pushing and pulling, or bending of the handlebars 19 by the motorcycle driver.

The handlebar pressure sensors 132 sense and transmit handlebar bending data to the vehicle driving simulator controller (not shown), allowing the tilting yoke mechanism 22 or 122 to move the pneumatic cylinders 40 thereby causing the motorcycle 16 to lean to the left or to the right, thereby simulating a realistic road riding experience. Advantageously, the vehicle driving simulator 10 and the vehicle driving simulator 110 may both includes a tilt sensor 34 that measures tilt relative to the vertical axis A2, and one or more handlebar pressure sensors 132 that sense and transmit handlebar bending data to the vehicle driving simulator controller (not shown) that controls the tilting yoke mechanism 22 or 122. The tilt sensor 34 and the handlebar pressure sensors 132 also provide data to a graphic simulator processing unit (not shown) associated with the head-up display (not shown), and/or to a feedback monitor (not shown).

Driving simulation software in the vehicle driving simulator controller (not shown) may therefore be informed by the handlebar bending data from the handlebar pressure sensors 132 and data from the tilt executed by the tilting yoke mechanism 22 and 122 and acquired by the tilt sensor 34. When this data is combined with the images in the head-up display, provide the driver an enhanced and synchronized visual experience.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle driving simulator comprising:
a chassis having two rotatable drums mounted therein, mechanically connected together, and configured to engage wheels of a motorcycle mounted on the chassis;
a tilting yoke mechanism including a substantially rigid frame having a base attached to the chassis and a mounting post extending from the base and oriented perpendicularly relative to a load supporting surface of the chassis, the tilting yoke mechanism further including a substantially rigid attachment bracket attached to between the mounting post and an axle of a rear wheel of the motorcycle, wherein the attachment bracket is pivotally attached to a distal end of the mounting post;

a resistance device attached between the attachment bracket and base of the frame; and a tilt sensor attached to the mounting post of the frame of the tilting yoke mechanism; and a pressure sensor mounted to a handlebar of the motorcycle and operably connected to a vehicle driving simulator controller;

wherein the pressure sensor is configured to detect and measure movement of the handlebar caused by bending of the handlebar by a motorcycle driver.

2. The vehicle driving simulator according to claim 1, wherein the resistance device is one of a pneumatic cylinder and a hydraulic cylinder.

3. The vehicle driving simulator according to claim 1, wherein the pressure sensor comprises a plurality of strain gauges.

4. The vehicle driving simulator according to claim 1, wherein the pressure sensor comprises a load cell.

5. The vehicle driving simulator according to claim 1, wherein the pressure sensor is configured to detect and measure movement within the range of +/−0.00001 inch.

6. The vehicle driving simulator according to claim 1, further including a pair of straps attached to a fork of the motorcycle mounted on the chassis, the straps extending between the fork and the chassis.

7. The vehicle driving simulator according to claim 1, wherein the attachment bracket is substantially U-shaped having a base portion and two substantially parallel legs extending therefrom, the legs configured for attachment to the axle of the rear wheel of the motorcycle.

8. The vehicle driving simulator according to claim 7, wherein the resistance device is attached between an outboard end of the base portion of the attachment bracket and the mounting post.

9. The vehicle driving simulator according to claim 7, further including an elongated cylinder mounting member attached to the base portion.

10. The vehicle driving simulator according to claim 9, wherein the resistance device is attached between a distal end of the cylinder mounting member and the base of the frame.

11. The vehicle driving simulator according to claim 1, wherein the pressure sensor is configured to sense and transmit handlebar bending data to the vehicle driving simulator controller, and wherein the vehicle driving simulator controller generates a signal causing the tilting yoke mechanism to move the resistance device, thus causing the motorcycle to lean one of to the left and to the right, thereby simulating a realistic road riding experience.

12. A vehicle driving simulator comprising:

a chassis having two rotatable drums mounted therein, mechanically connected together, and configured to engage wheels of a motorcycle mounted on the chassis;

a frame attached to the chassis;

an attachment bracket attached to the motorcycle and pivotally connected at a pivot joint to the frame; and a pressure sensor mounted to a handlebar of the motorcycle, operably connected to a vehicle driving simulator controller, and configured to detect and measure movement of the handlebar caused by bending of the handlebar by a motorcycle driver, wherein the pressure sensor is configured to sense and transmit handlebar bending data to the vehicle driving simulator controller, and wherein the vehicle driving simulator controller generates a signal causing the frame to move a resistance device, thus causing the motorcycle to lean one of to the left and to the right, thereby simulating a realistic road riding experience.

13. The vehicle driving simulator according to claim 12, wherein the resistance device is attached between the attachment bracket and the frame, and wherein the resistance device is one of a pneumatic cylinder and a hydraulic cylinder.

14. The vehicle driving simulator according to claim 12, wherein the pressure sensor comprises a plurality of strain gauges.

15. The vehicle driving simulator according to claim 4, wherein the pressure sensor comprises a load cell.

16. The vehicle driving simulator according to claim 12, wherein the pressure sensor is configured to detect and measure movement within the range of +/−0.00001 inch.

17. The vehicle driving simulator according to claim 12, further including a pair of straps attached to a fork of the motorcycle mounted on the chassis, the straps extending between the fork and the chassis.

\* \* \* \* \*